June 3, 1952  B. R. LESTER  2,599,266
ELECTRONIC SWITCHING CIRCUIT
Filed Sept. 15, 1950
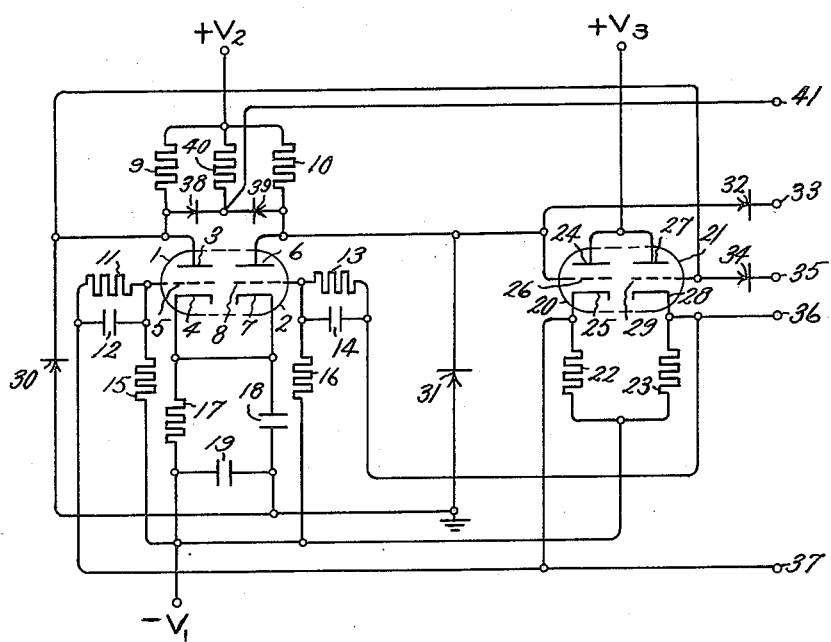
Inventor:
Burton R. Lester,
by Merton D Morse
His Attorney.

Patented June 3, 1952

2,599,266

UNITED STATES PATENT OFFICE 2,599,266

ELECTRONIC SWITCHING CIRCUIT

Burton R. Lester, Camillus, N. Y., assignor to General Electric Company, a corporation of New York Application September 15, 1950, Serial No. 185,064

3 Claims. (Cl. 250—27)

My invention relates to triggered multivibrator circuits of the type having two conditions of stability and, more particularly, to an electrical network for coupling a trigger pulse into such multivibrator circuits.

It is an object of my invention to provide a new and improved network for coupling a negative trigger pulse to the input circuit of a triggered multivibrator.

Another object of my invention is to provide an improved triggered multivibrator of the type having two conditions of stability which is suitable for use as a switching device in an electrical counting system.

In the attainment of the foregoing objects, I provide a pair of electron discharge devices or electronic valves in a conventional Eccles-Jordan flip-flop or triggered type multivibrator circuit. A negative trigger voltage pulse is applied to the control electrode of one of these devices through one of a pair of cathode followers. Each cathode follower is connected to conduct on alternate triggering pulses causing the multivibrator to trip from one stable conduction condition to the other on succeeding triggers. These same cathode followers couple the multivibrator output signal to a load circuit and thus serve the dual purpose of reducing the capacitive loading of the anode circuits of the multivibrator and of providing a stiff driving circuit for the control electrodes of the multivibrator. Diode coupling is employed in the trigger circuit to give reliable triggering at high frequencies while providing excellent discrimination against positive trigger signals. As will hereinafter be shown, this type of trigger circuit is applicable in cases where it is desirable to trigger the multivibrator from a plurality of sources.

For further objects and advantages and for a better understanding of my invention, attention is now directed to the following description and accompanying drawing and also to the appended claims. In the single figure of the drawing is shown a schematic circuit diagram illustrating an embodiment of my invention constituting a multivibrator circuit having two conduction conditions of stability which is provided with a novel input circuit for receiving triggering voltage pulses.

Referring to the drawing, there is illustrated a multivibrator circuit comprising a pair of electron discharge devices 1 and 2 which may be enclosed in one envelope, as shown. Device 1 is provided with an anode 3, a cathode 4 and a control electrode 5, and device 2 is provided with an anode 6, a cathode 7, and a control electrode 8. A pair of load resistors 9 and 10 are connected in the anode circuits of devices 1 and 2 respectively, both of which include a source of positive operating voltage conventionally indicated as $+V_2$. Input coupling networks comprising the parallel combination of a resistor and a capacitor are provided in the grid circuits of the multivibrator. Resistor 11 and capacitor 12 are connected to the grid 5 of device 1, and resistor 13 and capacitor 14 are connected to the grid 8 of device 2. Grid leak resistors 15 and 16 are respectively connected between electrodes 5 and 8 and a source of negative voltage $V_1$. Cathodes 4 and 7 are connected together and they are coupled for direct currents to source $V_1$ through cathode resistor 17. Capacitors 18 and 19 are serially connected across resistor 17 and the junction of capacitors 18 and 19 is grounded.

A pair of cathode follower discharge devices 20 and 21 have separate cathode resistors 22 and 23. Device 20 is provided with an anode 24, a cathode 25, and a control electrode 26. Device 21 is provided with an anode 27, a cathode 28, and a control electrode 29. Electrical connections are provided between anode 3 and control electrode 29 and between anode 6 and control electrode 26 directly to couple the output of the multivibrator to the cathode followers. In this circuit, unidirectional impedance devices 30 and 31 may be respectively connected from anodes 3 and 6 to ground. In this application, these devices are voltage limiters which maintain the anodes of the multivibrator at or above ground potential. Thus, either anode voltage swing of the multivibrator and, hence, the output voltage thereof is maintained at the potential of source $V_2$ during cutoff and at ground potential during conduction. In consequence thereof, the output voltage levels are relatively independent of variation in the operating characteristics of devices 1 and 2. Because the characteristics of discharge devices change with age, this latter feature is of great value where long life and reliability of operation is required.

A unidirectional impedance 32 is connected between a reset terminal 33 and control electrode 26, and a unidirectional impedance 34 is connected between a reset terminal 35 and control electrode 29. The output signal of the multivibrator may be obtained between either of a pair of output terminals 36 and 37, which are connected to the cathodes of the cathode followers, and ground. Unidirectional impedance devices 38 and 39 are serially connected back-to-back between the anodes of the multivibrator. A resistor 40 is connected from the junction of devices 38 and 39 to the source of direct voltage V₂. An input terminal 41 is electrically connected to the junction of devices 38 and 39. A source of voltage V₃ provides anode voltage for cathode followers 20 and 21.

My invention is more particularly concerned with the network for supplying an input pulse to the multivibrator. This network comprises the previously mentioned resistor 40, unidirectional impedance devices 38 and 39, and cathode followers 20 and 21 with their associated circuit elements. Negative triggering voltage pulses are applied at terminal 41 and appear at the junction of impedances 38 and 39. During either of the stable conduction conditions of the multivibrator, one of its discharge devices is in the conducting state and the other of its discharge devices is in the non-conducting state. By virtue of the fact that impedance devices 38 and 39 provide a high impedance in the directions opposite to the sense of the arrows shown therefor in the drawing, the anode of the non-conducting discharge device is at the voltage level of source V₂, while the anode of the conducting discharge device is substantially at the voltage level of ground. Since the only voltage existing across either of devices 38 or 39 during either stable conduction condition of the multivibrator is such as to cause current therein in the direction of high impedance, substantially no current exists in the two impedance devices. It thus follows that the junction of impedance devices 38 and 39 is also at the voltage level of source V₂.

As is indicated in the drawing, devices 38 and 39 conduct only when the voltage level at the junction thereof is less than the voltage level of anode 3 or anode 6. By selecting the value of source V₂ relatively high with respect to ground, such, for example, as 100 volts, a large voltage bias exists across the impedance device connected to the conducting discharge device and zero voltage bias exists across that impedance device connected to the non-conducting discharge device. A negative triggering voltage pulse having an amplitude less than the voltage of source V₂ supplied to terminal 41 is thus transmitted only by the zero biased unidirectional impedance device to the cathode follower control electrode connected thereto. This causes a corresponding negative voltage pulse across the associated cathode resistor which is applied to the control grid of the conducting multivibrator discharge device through a parallel resistor-capacitor coupling network. As a result, the current in the conducting discharge device decreases and the anode thereof becomes more positive, thereby impressing a more positive voltage on the control electrode of the other cathode follower device. This, in turn, causes the cathode of this other cathode follower device to become more positive. This voltage is fed back to the control grid of the originally non-conducting multivibrator discharge device to make it begin conducting. The anode of the originally non-conducting device therefore further changes negatively in potential, in sympathy to the input triggering pulse, and the action just described rapidly becomes cumulative, causing the originally non-conducting multivibrator discharge device to conduct saturation current and the originally conducting multivibrator discharge device to be cut off. From the foregoing, it will be seen that successive negative triggering voltage pulses applied between the single input terminal 41 and ground cause the multivibrator to be switched from one stable conduction condition to the other.

One advantage made possible by this input circuit is that one of unidirectional impedance devices 38 and 39 is always biased by a voltage equal to the full anode swing of the multivibrator so that each triggering voltage pulse is routed to the proper cathode follower device and thence to the control grid of the conducting multivibrator discharge device. Positive input voltage pulses or noise signals can have no effect on the multivibrator since they encounter the high impedance of the unidirectional impedance devices 38 and 39. A further advantage of the present input network results from the employment of a cathode-follower-connected discharge device connected between the anode of each multivibrator discharge device and the control electrode of the other multivibrator discharge device, namely, that considerably less capacitive loading on the anodes of the multivibrator discharge devices to ground is obtained and the rise time of switching is greatly reduced as a result. The maximum frequency of triggering pulses which is accepted by the multivibrator is therefore increased, one typical circuit of this type, for which the circuit constants are given hereinafter, triggering reliably from negative voltage pulses of 0.5 microsecond duration at a frequency of 250 kilocycles. With the output of the multivibrator taken across cathode resistor 22 or cathode resistor 23 as shown, an extremely low dynamic output impedance (roughly equal to the reciprocal of the mutual conductance of the cathode follower discharge device) and a very low D. C. output impedance is presented to the output circuit.

Another feature of this circuit is the ease with which it may be cleared, i. e., set in a predetermined one of the two stable conduction conditions. Reset terminals 33 and 35 are normally maintained at or above the voltage level of source V₂. A positive voltage pulse applied to either of these terminals, therefore, has no effect on the circuit since unidirectional impedance devices 32 and 34 are nonconductive in the conventional current flow direction from reset terminals 33 and 35 to source V₂. Assume, however, that it is desired to positively set the multivibrator in the stable conduction condition during which the discharge device 1 is non-conducting. A negative voltage pulse is applied between reset terminal 33 and ground. If device 1 is already non-conducting, device 2 is conducting and control electrode 26 is at approximately ground potential. Thus, the reset voltage pulse, which is normally much less in amplitude than the voltage of source V₂, is not transmitted by impedance device 32 and even if it were transmitted, would not act to trigger the multivibrator. However, if device 1 is conducting, device 2 is non-conducting and a near zero voltage bias exists across device 32. Thus, the negative voltage pulse applied between reset terminal 33 and ground is transmitted to control electrode 26, causing a similar negative voltage pulse across cathode resistor 22 which is applied to control electrode 5, beginning a cumulative action, described hereinbefore, which quickly triggers the multivibrator to the stable conduction condition in which device 1 is non-conducting. Thus, a negative voltage pulse applied between terminal 33 and ground always assures that the multivibrator is set, or reset, in the stable conduction condition with device 1 cut off; and by similar reasoning, a negative voltage pulse applied between reset terminal 35 and ground always assures that the multivibrator is set, or reset, in the stable condition with device 2 cut off.

By way of illustration only, and not by way of limiting this application thereto, the following component values have been found to give efficient operation in a particular construction of this multivibrator circuit:

| Resistor | Kil Ohms | Capacitor | Micro-Micro-Farad | Devices | Type |
|---|---|---|---|---|---|
| 9  | 15  | 12 | 30     | 1  | ½12AT7. |
| 10 | 15  | 14 | 30     | 2  | ½12AT7. |
| 11 | 100 | 18 | 10,000 | 20 | ½12BH7. |
| 13 | 100 | 19 | 10,000 | 21 | ½12BH7. |
| 16 | 30  |    |        | 30 | 1N65. |
| 15 | 30  |    |        | 31 | 1N65. |
| 22 | 47  |    |        | 32 | 1N65. |
| 23 | 47  |    |        | 34 | 1N65. |
| 17 | 6.2 |    |        | 38 | 1N65. |
| 40 | 47  |    |        | 39 | 1N65. |

While a particular embodiment of this invention has been shown and described, it will, of course, be understood that various modifications may be made without departing from the invention. Therefore, by the appended claims, I intend to cover all such changes and modifications which fall within the true spirit and scope of my invention.

What I claim as new and desire to secure by Letters Patent of the United States is:

1. A multivibrator circuit comprising a first and second electron discharge device, each of said devices being provided with an anode, a cathode, and a control electrode, said devices having two conditions of stability in which either of them is conducting while the other is non-conducting, a source of direct voltage, a first and a second impedance being connected between said source and the anodes of said first and second devices respectively, a third and a fourth electron discharge device, each of said devices being provided with an anode, a cathode, and a control electrode, individual cathode impedances being connected to said third and fourth devices, the control electrode of said third device being connected to be supplied with a voltage signal from the anode of said first device, the cathode of said third device being connected to the control electrode of said second device to supply a voltage signal thereto, said fourth device being similarly connected to the control electrode of said first device and the anode of said second device, a pair of unidirectional impedance devices connected to conduct electrons from ground to the anodes of said first and second devices, and a pair of unidirectional impedance devices being serially connected back-to-back between the anodes of said first and second devices, said impedance devices being arranged to conduct electrons to the anodes of said first and second devices, the junction of said impedance devices providing an input terminal for negative voltage trigger pulses to trip said first and second devices from one stable condition to the other.

2. A single terminal input circuit for receiving triggering voltage pulses to trigger a flip-flop circuit; said flip-flop circuit comprising two electric discharge devices each having an anode, a cathode, and a control electrode; said input circuit comprising a pair of unidirectional impedance devices connected back-to-back between said anodes and providing a single input terminal at the junction therebetween, two cathode-follower-connected electric discharge devices each having an anode, a cathode, and a control electrode, each of said cathode-follower-connected electric discharge devices having a connection from its control electrode to the anode of a different one of said first-mentioned two electric discharge devices and from its cathode to the control electrode of the other of said first-mentioned two electric discharge devices, whereby a voltage pulse received at said input terminal is routed through a preselected one of said cathode-follower-connected electric discharge devices to the control electrode of one of said first-mentioned two electric discharge devices to trigger said flip-flop circuit.

3. A triggering input circuit for a flip-flop circuit; said flip-flop circuit including two electric discharge devices each having an anode, a cathode, a control electrode, and provided with an anode resistor for connection to a source of operating voltage; said input circuit comprising a pair of unidirectional impedance devices connected back-to-back between the anodes of said two discharge devices and providing a common input terminal at the junction therebetween, a resistor connected to said junction and provided for connection to said source, alternate ones of said impedance devices being conductive during successive negative voltage pulses applied to said input terminal, two cathode-follower-connected electric discharge devices each having an anode, a cathode, and a control electrode, each of said cathode-follower-connected electric discharge devices connected from its control electrode to the anode of a different one of said first-mentioned two electric discharge devices and from its cathode to the control electrode of the other of said first-mentioned electric discharge devices, and a unidirectional impedance device connected to the control electrode of one of said cathode-follower devices to provide a reset terminal.

BURTON R. LESTER.

REFERENCES CITED

The following references are of record in the file of this patent:

UNITED STATES PATENTS

| Number | Name | Date |
|---|---|---|
| 2,540,539 | Moore | Feb. 6, 1951 |

OTHER REFERENCES

Electrical Counting, by W. B. Lewis, copy dated May 27, 1944, pages 86 and 89.